United States Patent
Wu et al.

(10) Patent No.: US 11,112,837 B2
(45) Date of Patent: Sep. 7, 2021

(54) HINGES WITH A GRAPHENE COATING

(71) Applicant: HEWLETT-PACKARD DEVELOPMENT COMPANY, L.P., Spring, TX (US)

(72) Inventors: Kuan-Ting Wu, Taipei (TW); Wei-Chung Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/335,828

(22) PCT Filed: Dec. 14, 2016

(86) PCT No.: PCT/US2016/066718
§ 371 (c)(1),
(2) Date: Mar. 22, 2019

(87) PCT Pub. No.: WO2018/111269
PCT Pub. Date: Jun. 21, 2018

(65) Prior Publication Data
US 2020/0026333 A1    Jan. 23, 2020

(51) Int. Cl.
*E05D 11/08* (2006.01)
*G06F 1/16* (2006.01)
(Continued)

(52) U.S. Cl.
CPC .............. *G06F 1/1681* (2013.01); *E05D 3/02* (2013.01); *E05D 7/00* (2013.01); *E05D 11/087* (2013.01);
(Continued)

(58) Field of Classification Search
CPC .......... Y10T 16/511; Y10T 16/540345; Y10T 16/540255; Y10T 16/5387; Y10T 16/5403;
(Continued)

(56) References Cited

U.S. PATENT DOCUMENTS 6,988,294 B2 *  1/2006  Birtley .................. E05D 11/087
                                                                          16/337
7,082,643 B2 *  8/2006  Lu ........................... E05C 17/64
                                                                          16/337
(Continued)

FOREIGN PATENT DOCUMENTS

CN         102965664 A        3/2013
CN         105177679 A       12/2015
(Continued)

OTHER PUBLICATIONS

Liang, Y. Q. et al, Large-scale Synthetic Graphene on Cu as Anti-corrosion Coating by Chemical Vapos Deposition Approach, Mar. 1, 2014 < http://www.incentaconnect.com/content/asp/sam/2014/00000006/00000003/art00017 >.

(Continued)

*Primary Examiner* — Chucky Y Mah
(74) *Attorney, Agent, or Firm* — HPI Patent Department

(57) ABSTRACT

In an example, a hinge may include a first hinge component having a first friction surface, and a second hinge component having a second friction surface. The second hinge component may be rotatably engaged with the first hinge component such that the first friction surface and the second friction surface are abutted against each other and are to move relative to one another if the first hinge component and the second hinge component are moved relative to one another. The hinge may include a graphene coating disposed on either of the first friction surface, or the second friction surface.

15 Claims, 5 Drawing Sheets

(51) Int. Cl.
*E05D 3/02* (2006.01)
*E05D 7/00* (2006.01)

(52) U.S. Cl.
CPC ....... *E05Y 2900/606* (2013.01); *G06F 1/1616* (2013.01)

(58) Field of Classification Search
CPC ......... Y10T 16/53828; Y10T 16/53838; Y10T 16/53888; E05D 3/02; E05D 7/00; E05D 11/06; E05D 11/087; E05D 11/1028; G06F 1/1616; G06F 1/1681; E05Y 2900/606
See application file for complete search history.

(56) References Cited

U.S. PATENT DOCUMENTS

| | | | | |
|---|---|---|---|---|
| 7,107,649 | B2 * | 9/2006 | Nishihara | G06F 1/1616 16/303 |
| 7,143,476 | B2 * | 12/2006 | Minami | G06F 1/1616 16/340 |
| 7,146,195 | B2 * | 12/2006 | Sudo | H04M 1/0212 455/575.1 |
| 7,353,569 | B2 * | 4/2008 | Chen | G06F 1/1601 16/340 |
| 7,603,747 | B2 * | 10/2009 | Ho | G06F 1/1616 16/330 |
| 7,679,909 | B2 * | 3/2010 | Spearing | E05D 11/00 165/80.4 |
| 7,921,515 | B2 * | 4/2011 | Chiang | G06F 1/1616 16/330 |
| 8,015,666 | B2 * | 9/2011 | Wang | G06F 1/1616 16/320 |
| 8,051,537 | B2 * | 11/2011 | Wang | E05D 11/087 16/330 |
| 9,561,526 | B2 * | 2/2017 | Sumant | C10M 177/00 |
| 10,197,121 | B2 * | 2/2019 | Filip | F16D 65/127 |
| 2011/0072615 | A1 * | 3/2011 | Tanemura | G06F 1/1681 16/277 |
| 2013/0251998 | A1 | 9/2013 | Hwang et al. | |
| 2013/0342974 | A1 * | 12/2013 | Hung | H04M 1/0216 361/679.01 |
| 2014/0023864 | A1 * | 1/2014 | Sumant | C10M 103/04 428/408 |
| 2015/0129544 | A1 | 5/2015 | Davis et al. | |
| 2018/0171251 | A1 * | 6/2018 | Sumant | C23C 16/40 |

FOREIGN PATENT DOCUMENTS

| | | | |
|---|---|---|---|
| DE | 102015216159 B3 * | 3/2016 | ............. E05D 3/02 |
| RU | 2207454 C2 | 6/2003 | |
| RU | 132118 U1 | 9/2013 | |
| WO | WO-2013062951 A1 | 5/2013 | |
| WO | WO-2013160664 A1 | 10/2013 | |
| WO | WO-2015108596 A2 | 7/2015 | |

OTHER PUBLICATIONS

Srinivasan, A. et al, Comparison of in Situ and Ex Situ Reduced Graphene Oxide Reinforced Electroless Nickel Phosphorus Nanocomposite Coating, Nov. 30, 2014 < http://www.sciencedirect.com/science/article/pii/S0169433214019655.

* cited by examiner

HINGES WITH A GRAPHENE COATING

BACKGROUND

Devices such as electronic devices may include portions that may be movable relative to one another. Such devices may include a hinge or hinges to engage one portion with another portion so as to enable the portions to pivot or move relative to each other, or to fold on to one another.

DETAILED DESCRIPTION

Figure 1A:
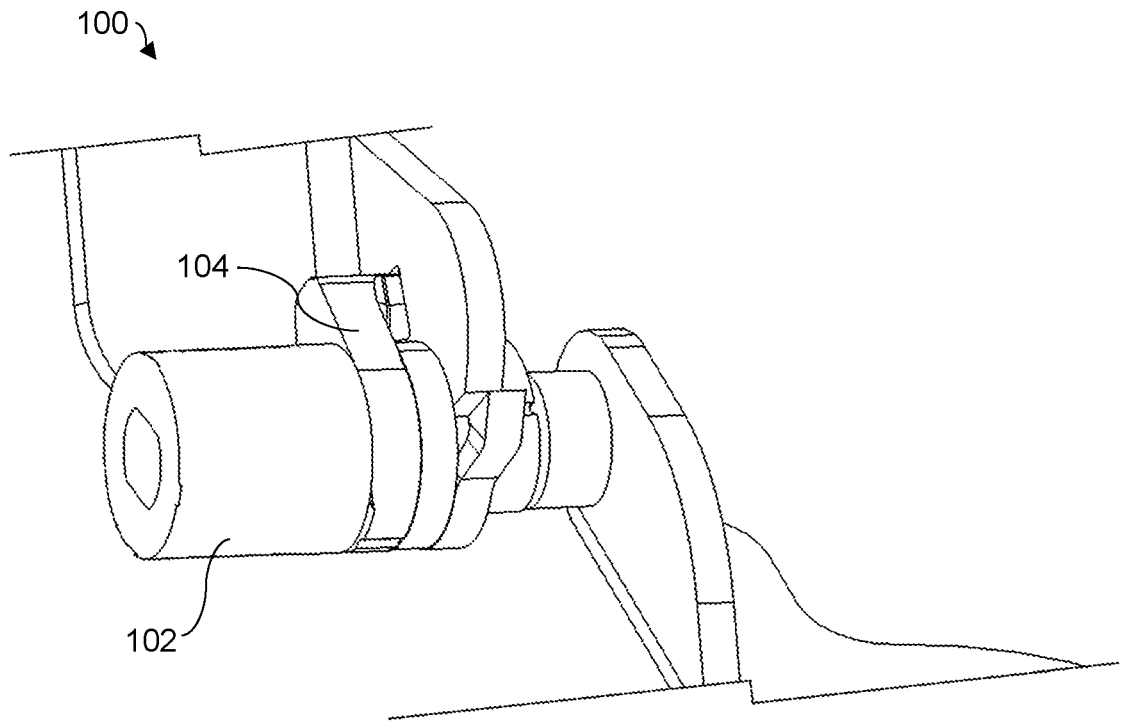
FIG. 1A is a perspective view of an example hinge.

Devices such as electronic devices may include portions that may be movable relative to one another. In some situations, electronic devices such as computing devices, or, more specifically clamshell-type computing devices, may have a base portion and a display portion that may be hingeably, rotatably, pivotably, or otherwise movably engaged with each other through the use of a hinge or multiple hinges. In other words, some devices may include a hinge to engage one portion of the device with another portion so as to enable the portions to move relative to each other. Such movement of the portions of a device may result in components of a hinge to move against each other, thereby resulting in friction forces being exerted against such hinge components.

Hinge components that move against each other may experience premature wearing, binding, galling, abrasion, or other material damage or breakdown which may stem from the friction exerted on such components from movement of the hinge. Further, hinge components may be susceptible to corrosion resulting from such damage or breakdown of the components or contact surfaces thereon. Additionally, hinge stiffness, or the amount of force needed to be applied to the hinge to cause the hinge, and thus the device portions, to move, may decline, decay, or otherwise loosen or lessen over repeated use through the premature damage or breakdown of the hinge components due to friction.

In some implementations, it may be desirable to utilize a material in a hinge of a device, or to coat the components of such a hinge with a material to increase the durability of the hinge components. The hinge components may be more resistant to premature damage or breakdown due to friction if such a durable material is used in the hinge or is used to coat the components of a hinge, or contact surfaces thereon. Such a durable material may additionally prevent corrosion of the hinge and/or the decline or decay in the hinge stiffness by preventing or lessening premature wear or abrasion of the hinge components, or contact surfaces thereon, from friction. Additionally, it may be desirable to implement a material in a hinge that may support or enable the hardening of the components of the hinge through heat treatments or other processes, or increase the hardenability of such components, thereby further preventing premature hinge component damage, abrasion, and/or wear.

Implementations of the present invention provide hinges with a graphene coating to resist abrasion and/or premature damage or breakdown of the hinges, or components or surfaces therein. Further, hinges having a graphene coating as described herein may be more resistant to corrosion, and may also support or enable hardening of the components of the hinges, or increase the hardenability of such components. Yet further, hinges described herein may be resistant to the premature decline or decay of the stiffness of the hinges due to decreased premature wear, corrosion, or abrasion.

Figure 1B:
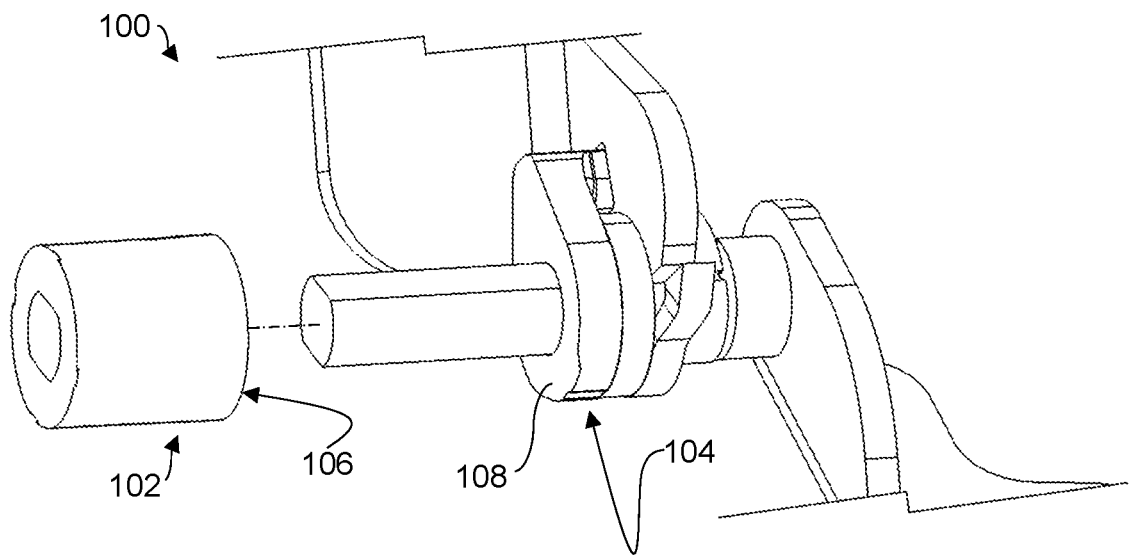
FIG. 1B is a partially exploded perspective view of an example hinge.
Figure 1C:
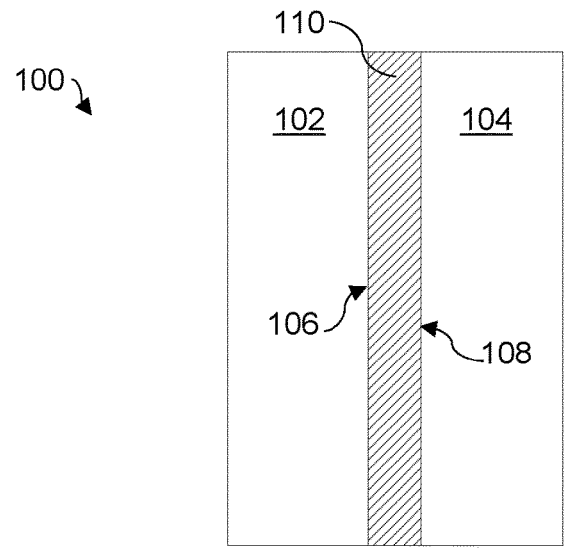
FIG. 1C is a schematic view of a composition of an example hinge.

Referring now to FIG. 1A, a perspective view of an example hinge 100 is illustrated. Referring additionally to FIG. 1B, a partially exploded perspective view of the example hinge 100 is illustrated. Example hinge 100 may include a first hinge component 102 having a first friction surface 106, and a second hinge component 104 having a second friction surface 108. In some implementations, the second hinge component 104 may be rotatably engaged with the first hinge component 102 such that the first friction surface 106 and the second friction surface 108 are abutted against each other and are to move relative to one another if the first hinge component 102 and the second hinge component 104 are moved relative to one another. Referring additionally to FIG. 1C, a schematic view of a composition of the example hinge 100 is illustrated. Specifically, FIG. 1C illustrates the interface between the first hinge component 102 and the second hinge component 104. In some implementations, the example hinge 100 may include a graphene coating 110, sometimes referred to as a graphene layer, or multi-layer graphene coating, disposed in between the first friction surface 106 and the second friction surface 108. In some implementations, the graphene coating may be disposed on either of the first friction surface 106, or the second friction surface 108.

Figure 2A:
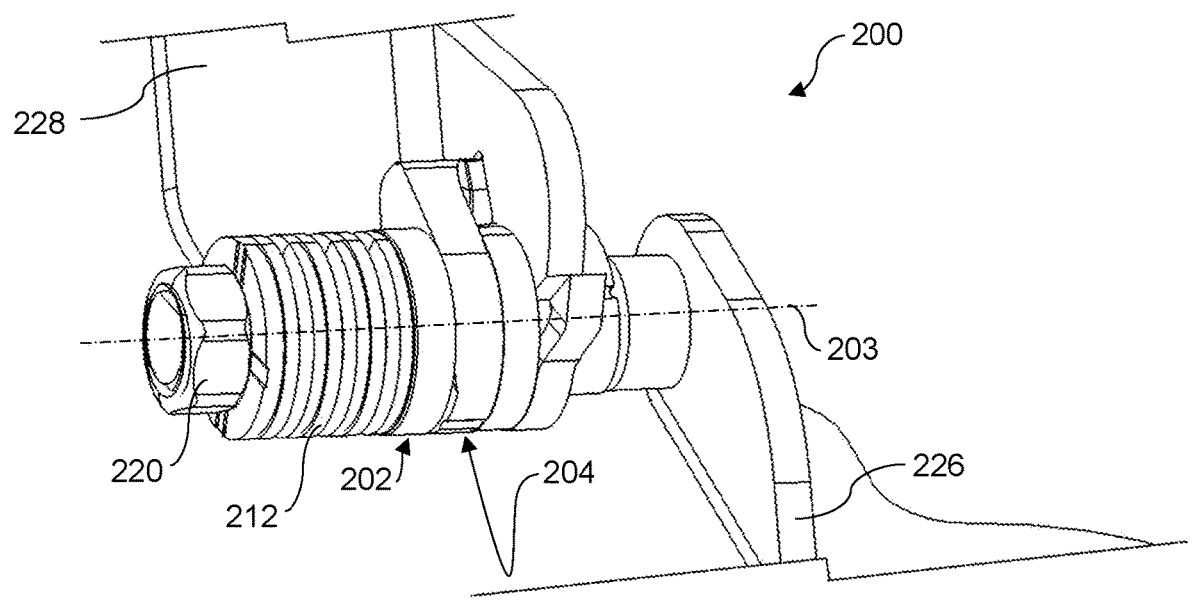
FIG. 2A is a perspective view of an example hinge.

Referring now to FIG. 2A, a perspective view of an example hinge 200 is illustrated. Example hinge 200 may be similar to example hinge 100. Further, the similarly named elements of example hinge 200 may be similar in function and/or structure to the elements of example hinge 100, as they are described above. In some implementations, the example hinge 200 may be referred to as a device hinge, or, in further implementations, may be referred to as an electronic device hinge. Example hinge 200 may include a first hinge component 202 and a second hinge component 204. Either or both of the first hinge component 202 and the second hinge component 204 may be a rigid or semi-rigid element or member of the hinge 200. In some implementations, the first and/or second hinge components 202, 204 may have a substantially cylindrical or barrel shape. In other implementations, the first and/or second hinge components 202, 204 may have another structure or geometry. In some implementations, the first hinge component 202 and/or the second hinge component 204 may include a metallic material, such as steel, for example. In further implementations, the first hinge component 202 and/or the second hinge component 204 may include a carbon steel, or a steel alloy comprising two or more of iron, carbon, manganese, silicon, phosphorous, sulfur, chromium, niobium, vanadium, zirconium, and/or tungsten. In other implementations, the first hinge component 202 and/or the second hinge component 204 may include another suitable material for receiving a graphene coating.

The first hinge component 202 and the second hinge component 204 may be movably engaged with each other. Further, in some implementations, the example hinge 200 may include a base structure 226 and a secondary structure 228. The base structure 226 may be fixed or fixedly attached to the first hinge component 202, and, in further implementations, the secondary structure 228 may be fixed or fixedly attached to the second hinge component 204. Thus, the base structure 226 and the secondary structure 228 may be movably engaged with each other, and may be moved relative to one another, thereby causing the first hinge component 202 and the second hinge component 204 to be moved relative to each other. In some implementations, the hinge 200 may be rotatable, pivotable, or otherwise movable along an axis of rotation 203, sometimes referred to as a central axis of the hinge 200. In further implementations, the base structure 226 may be rotatable, pivotable, or otherwise movable relative to the secondary structure 228 about the axis of rotation, and vice versa. Upon the base structure 226 being moved about axis of rotation 203 relative to the secondary structure 228, the first hinge component 202 may also move about the axis of rotation 203 relative to the second hinge component 204.

Figure 2B:
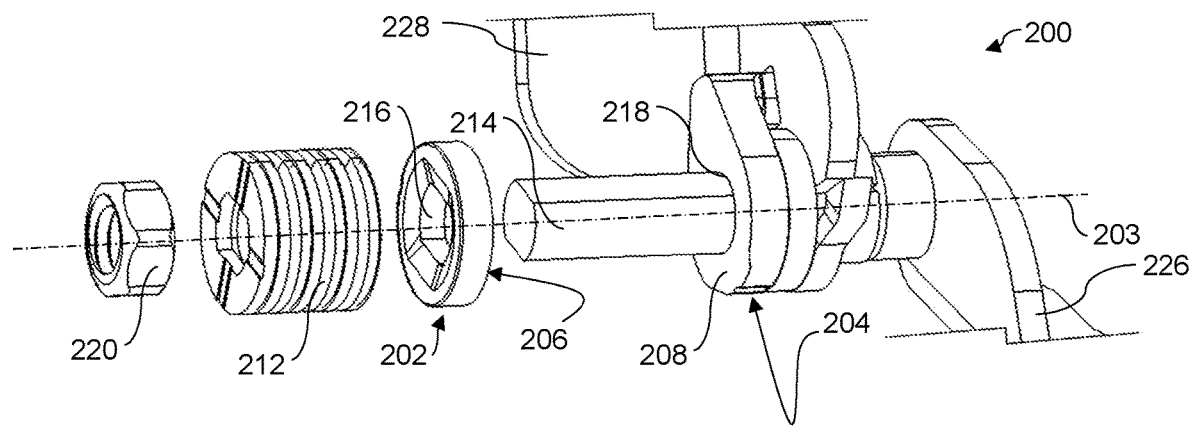
FIG. 2B is a partially exploded perspective view of an example hinge.

Referring additionally to FIG. 2B, a partially exploded perspective view of the example hinge 200 is illustrated. The first hinge component 202 may include a first friction surface 206. The first friction surface 206 may be a planar or semi-planar surface extending along an inner side of the first hinge component 202. Similarly, the second hinge component 204 may include a second friction surface 208 extending along an inner side of the second hinge component 204. The second friction surface 208 may be similar to the first friction surface 206, in some implementations. In this context, inner side may refer to a side of one of the first or second hinge component that is facing the other of the first or second hinge component. The first friction surface 206 and the second friction surface 208 may be abutted against each other or contacting one another. Further, the first friction surface 206 and the second friction surface 208 may be movable against one another and relative to one another. In other words, if the base structure 226 and the secondary structure 228 are rotated, pivoted, or otherwise moved relative to one another, the first hinge component 202 and the second hinge component 204, and thus the first friction surface 206 and the second friction surface 208 may move in a similar or corresponding manner relative to one another, respectively. Such movement may include the first hinge component 202 and the second hinge component 204 moving relative to one another in an opposite but concentric manner about the axis of rotation 203 and generating friction force between the first friction surface 206 and the second friction surface 208, which may be in contact with each other throughout such movement. Stated differently, the first friction surface 206 and the second friction surface 208 may be abutted against each other and may be movable relative to each other such that friction or friction force is generated if the first friction surface 206 and the second friction surface 208 move or are moved relative to one another.

In some implementations, the first hinge component 202 may include a barrel 214. The barrel 214 may extend from the first friction surface 206 of the first hinge component 202 and through a central bore 218 of the second hinge component 204. The second hinge component 204 may be rotatable about, or rotatably disposed about, the barrel 214, in further implementations. In some implementations, the barrel 214 may be a unitary part of the first hinge component 202, and in other implementations, as illustrated in FIG. 2B, the barrel 214 may be considered part of the base structure 226, and may be assembled on to or into the first hinge component 202, or a bore 216 thereof, so as to be fixedly attached to or part of the first hinge component 202 and to extend from the first friction surface 206. Stated differently, the base structure 226 may include the barrel 214, which may extend from the base structure 226, in some implementations along the axis of rotation 203 of the hinge 200, and the first hinge component 202 may be fixed to the barrel 214. In further implementations, the barrel 214 and the bore 216 may have complementary geometry so as to prevent rotation of the first hinge component 202 about the barrel 214, such as a D-flat or other such preventative geometry. Further, the barrel 214 may have a central axis extending longitudinally along the barrel 214. In some implementations, the central axis may be the same axis as the axis of rotation 203 of the hinge 200. In other words, the first hinge component 202 and the second hinge component 204 may be movable relative to one another about the central axis of the barrel 214 such that the first friction surface 206 and the second friction surface 208 are to rotate against one another in a concentric manner, about the central axis, if the first hinge component 202 and the second hinge component 204 are moved relative to one another. It should be noted that, in some implementations, the first hinge component 202 may be considered to be part of, or a sub-component of, the base structure 226 such that it may be said that the base structure 226 includes the first hinge component 202. Similarly, the second hinge component 204 may be considered to be part of, or a sub-component of, the secondary structure 228 such that it may be said that the secondary structure 228 includes the second hinge component 204.

In some implementations, the hinge 200 may further include a bias member 212. The bias member 212 may be a resilient component that is elastically deformable. In other words, the bias member 212 may be capable of returning to its original shape after undergoing a deformation. In some implementations, the bias member 212 may exert a reactive force in response to being deformed, with such a reactive force being proportional to the degree of deformation. In some implementations, the bias member 212 may be a spring or a compression spring. In other implementations, the bias member 212 may be another type of spring, such as an extension spring, a torsion spring, or a leaf spring. In yet further implementations, the bias member 212 may be a plurality of bias members disposed along the barrel 214, or the central axis thereof, to push, pull, or otherwise urge the first friction surface 206 and the second friction surface 208 against one another through a reactive force of the bias member 212. In some implementations, the plurality of bias members may be a plurality of dome springs or an array of dome springs disposed along the barrel 214.

In some implementations, the hinge 200 may include a fastener 220 to retain the first hinge component 202 and the second hinge component 204, and the bias member 212 in some implementations, against each other. In further implementations, the barrel 214 may be at least partially threaded to receive the fastener 220. In further implementations, the fastener 220 may be a threaded fastener such as a nut, and may compress the bias member 212 along the barrel 214 such that the bias member 212 exerts a reactive force to urge the first and second hinge components 202, 204 against each other.

Figure 2C:
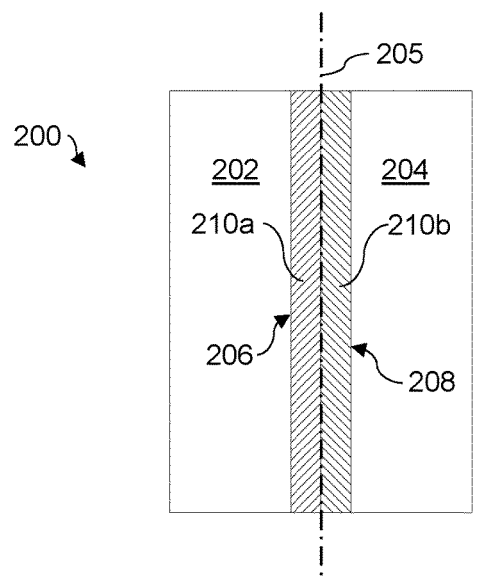
FIG. 2C is a schematic view of a composition of an example hinge.

Referring additionally to FIG. 2C, a schematic view of an example composition of the example hinge 200 is illustrated. FIG. 2C illustrates the engagement of the first hinge component 202 and the second hinge component 204, and thus the first friction surface 206 and the second friction surface 208. In some implementations, the first friction surface 206 and the second friction surface 208 may form a friction interface 205. In some implementations, the hinge 200 may include a graphene coating disposed on both the first friction surface 206 and the second friction surface 208. Stated differently, the example hinge 200 may include a first graphene coating 210a, sometimes referred to as a graphene layer, or multi-layer graphene coating, disposed on the first friction surface 206. Further, the hinge 200 may include a second graphene coating 210b, which may be similar to the first graphene coating 210a, disposed on the second friction surface 208. The first graphene coating 210a and the second graphene coating 210b may contact each other at the friction interface 205, and be moved along or against each other when the first and second hinge components 202, 204 are moved relative to one another. In further implementations, the first graphene coating 210a and/or the second graphene coating 210b may cover, coat, or be applied to additional portions of the first hinge component 202 and the second hinge component 204, respectively. In yet further implementations, additional elements, surfaces, or components of the hinge 200 may be covered or coated with a graphene coating.

The first graphene coating 210a and the second graphene coating 210b, sometimes referred to generally as the graphene coating, may refer to a sheet-like structure of graphite or carbon. In some implementations, the graphene coating may be a single layer of graphene, or, in other implementations, the graphene coating may be multi-layer graphene. More specifically, the graphene coating may be one or more layers of an atomic-scale, two-dimensional lattice of carbon atoms. The graphene coating, in some implementations, may be applied to the first friction surface 206 and/or the second friction surface 208 using application methods such as chemical vapor deposition (CVD) and physical vapor deposition (PVD), or another suitable application process. The graphene coating may be applied in a sufficient thickness to provide increased wear and corrosion resistance to the first friction surface 206 and the second friction surface 208. Additionally, the graphene coating may enable the first hinge component 202 and/or the second hinge component 204, or the respective first and/or second friction surfaces 206, 208 thereon, to be hardened through heat treatment or another process, or may increase such a component or surface's hardenability. Such hardening or increase in hardenability of the hinge components may also increase the corrosion and wear resistance of such components, and prolong the life of such components that are exposed to friction forces.

Figure 2D:
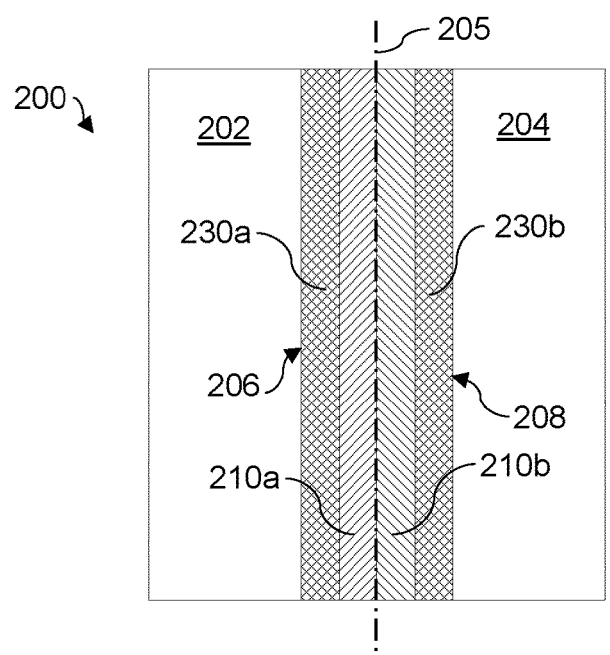
FIG. 2D is a schematic view of a composition of an example hinge.

Referring now to FIG. 2D, a schematic view of an example composition of the example hinge 200 is illustrated. Similar to FIG. 2C, FIG. 2D illustrates another implementation of the engagement of the first hinge component 202 and the second hinge component 204, and thus the first friction surface 206 and the second friction surface 208. In some implementations, the first hinge component 202 and/or the second hinge component 204 may include a first graphene coating 210a and a second graphene coating 210b covering or applied to the first friction surface 206 and the second friction surface 208, respectively. In some implementations, the hinge 200 may include nickel plating disposed on each of the first friction surface 206 and the second friction surface 208 beneath the respective graphene coating.

Stated differently, the first hinge component 202 and/or the second hinge component 204 may include a first nickel plating layer 230a and a second nickel plating layer 230b disposed on the first friction surface 206 and the second friction surface 208, respectively. In some implementations, the nickel plating layers 230a and/or 230b may be electroless nickel plating. In further implementations, the nickel plating layers 230a and 230b may be another type of electroplating suitable for providing corrosion and wear resistance to the first friction surface 206 and the second friction surface 208. In some implementations, the first friction surface 206 and the second friction surface 208 may each be electroless nickel plated, and then may each have a graphene coating applied using CVD, PVD, or another suitable process. In further implementations, the first friction surface 206 and the second friction surface 208 may each be plasma cleaned after the electroless nickel plating and prior to the application of the graphene coating.

Figure 2E:
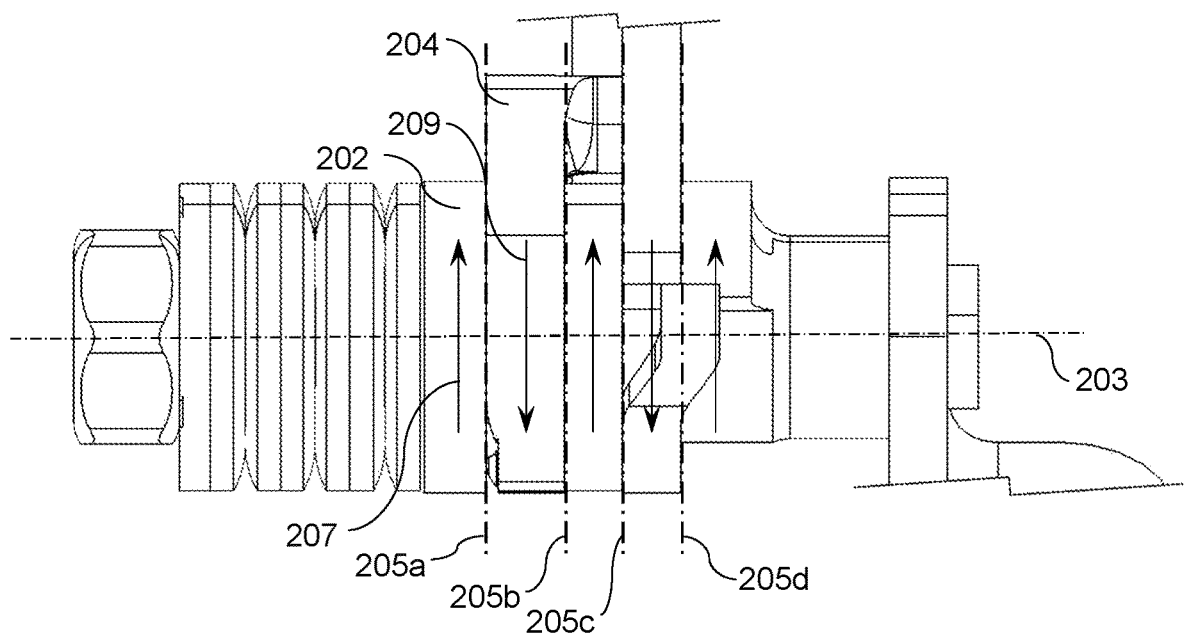
FIG. 2E is a front view of an example hinge.

Referring now to FIG. 2E, a front view of example hinge 200 is illustrated. In some implementations, the hinge 200 may include multiple friction interfaces, each friction interface including two friction surfaces abutted against each other and movable relative to one another, and wherein at least one friction surface of each friction interface comprises a graphene coating as described above. In other words, hinge 200 may include a plurality of friction interfaces 205a, 205b, 205c, 205d . . . up to 205n. Each of the friction interfaces may be similar to the friction interface 205, described above. Some or all of the friction interfaces 205n may be defined by a first portion of the hinge components moving in a first direction 207, and a second portion of the hinge components, adjacent to and abutted against the first portion, moving in a second direction 209, which may be opposite to, and in some implementations also concentric to, the first direction 207, thereby generating friction force within each friction interface 205n.

Figure 3A:
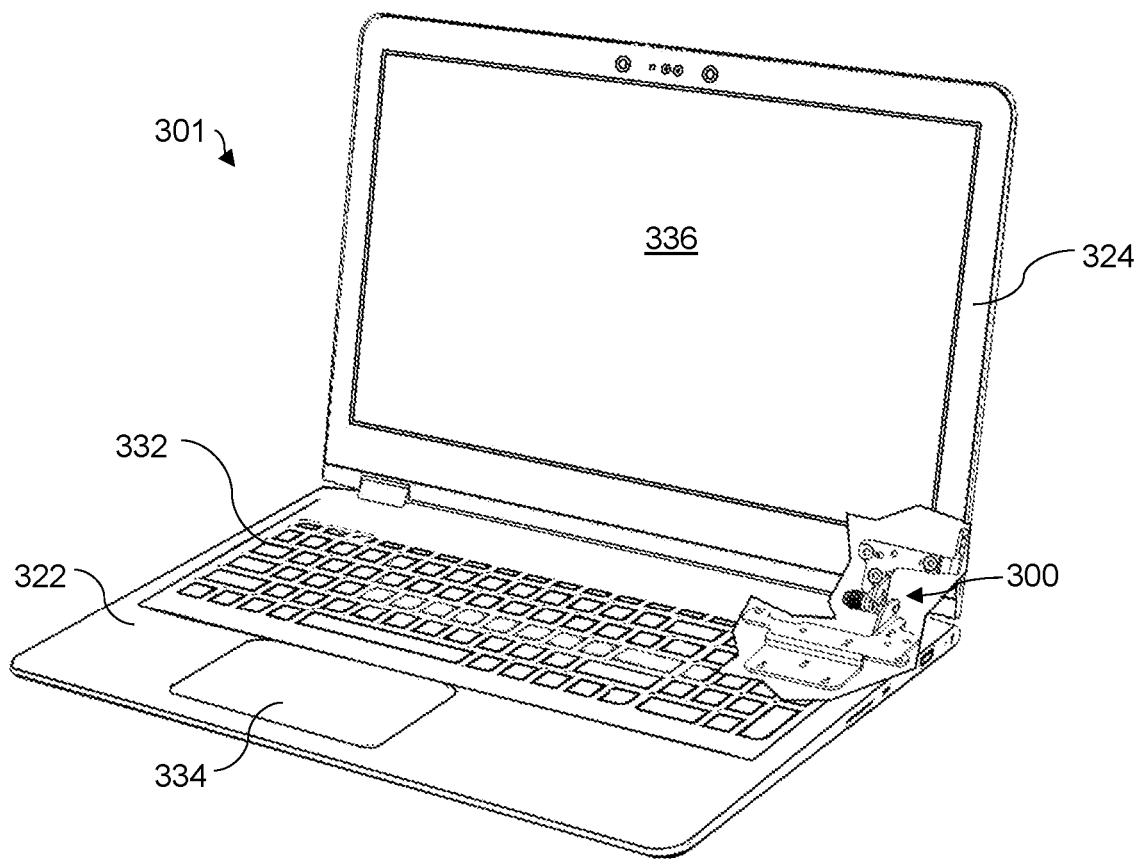
FIG. 3A is a perspective view of an example device having an example hinge.
Figure 3B:
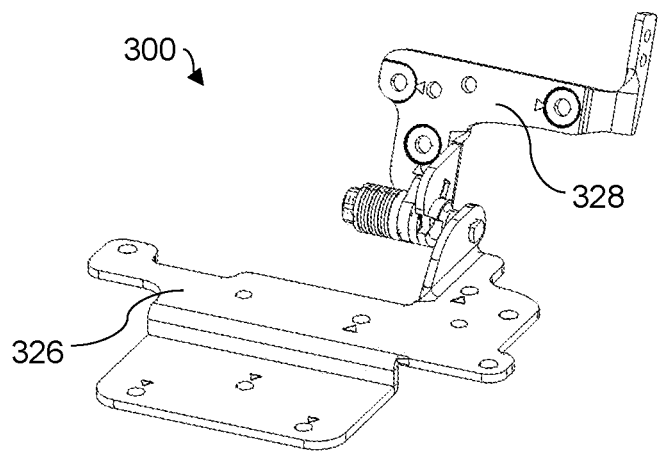
FIG. 3B is a perspective view of an example hinge.

Referring now to FIGS. 3A-3B, a perspective view of an example device 301 is illustrated, and a detail view of an example hinge or device hinge 300 is illustrated, respectively. Example hinge 300 may be similar to example hinge 100 or 200. Further, the similarly named elements of example hinge 300 may be similar in function and/or structure to the elements of example hinge 100 or 200, as they are described above. Device 301 may be a computing device in some situations, and may include components such as storage drives, processors, memory, optical drives, displays, keyboards, touch pads, cameras, or other components suitable for use in a computing device. In other implementations, device 301 may be another type of electronic device having a hinge 300. In some implementations, device 301 may include a base portion 322, and a display portion 324. The base portion 322 may include a keyboard 332 and/or a track pad 334 in some implementations, whereas the display portion 324 may include a display 336 or touch-screen display in further implementations.

The hinge 300 may include a base structure 326 fixed or fixedly attached to the base portion 322. The base structure may include a first hinge component having a first friction surface with a graphene coating. Further, the hinge 300 may include a secondary structure 328 fixed to or fixedly attached to the display portion 324. The secondary structure may include a second hinge component having a second friction surface abutted against the first friction surface and movable relative to the first friction surface. In some implementations, the second friction surface may also have a graphene coating, or, in other implementations, the second friction surface may have a graphene coating, and the first friction surface may not have one. The base portion 322 and the display portion 324 may be rotatable, pivotable, or otherwise movable relative to one another through the device hinge 300, and the first friction surface may move relative to the second friction surface if the base portion 322 is rotated relative to the display portion 324. Further, the base portion 322 may be rotatable relative to the display portion 324 along an axis of rotation of the hinge 300. In some implementations, the first friction surface and the second friction surface may rotate against one another in a concentric but opposite manner about the axis of rotation of the hinge 300 if the base portion 322 and the display portion 324 are rotated relative to one another. In some implementations, the display portion 324 may be able to fold down on to the base portion 322 in a clamshell manner. The base structure 326 and the secondary structure 328 may enable the base portion 322 and the display portion 324 to be movable relative to one another. In other words, the base structure 326 may move with the base portion 322, and the secondary structure 328 may move with the display portion 324.

What is claimed is:

1. A hinge, comprising:
a first hinge component having a first friction surface;
a second hinge component having a second friction surface, the second hinge component rotatably engaged with the first hinge component such that the first friction surface and the second friction surface are abutted against each other and are to move relative to one another if the first hinge component and the second hinge component are moved relative to one another, wherein the first hinge component comprises a barrel extending through a central bore of the second hinge component, wherein the second hinge component is rotatable about the barrel, and wherein the barrel and a bore of the first hinge have complementary geometry to prevent rotation of the first hinge component about the barrel; and
multiple graphene coatings disposed on both of the first friction surface and the second friction surface.

2. The hinge of claim 1, wherein the first friction surface and the second friction surface form a friction interface.

3. The hinge of claim 1, further comprising nickel plating disposed on each of the first friction surface and the second friction surface beneath the graphene coating.

4. The hinge of claim 1, wherein the complementary geometry is a D-flat geometry.

5. The hinge of claim 1, further comprising a bias member to urge the first friction surface and the second friction surface against one another.

6. The hinge of claim I, wherein the first hinge component and the second hinge component comprise a carbon steel.

7. A device hinge, comprising:
a base structure, comprising:
a barrel extending from the base structure along an axis of rotation of the device hinge; and
a first hinge component having a first friction surface, the first hinge component fixed to the barrel;
a secondary structure, comprising:
a second hinge component having a second friction surface, the second hinge component rotatably disposed about the barrel such that the first friction surface and the second friction surface are abutted against each other and are movable relative to each other such that friction is generated if the first friction surface and the second friction surface move relative to one another, wherein the barrel extends through a central bore of the second hinge component, and the barrel and a bore of the first hinge have complementary geometry to prevent rotation of the first hinge component about the barrel;
a bias member to urge the first friction surface and the second friction surface against one another; and
multiple graphene coatings disposed on both the first friction surface and the second friction surface.

8. The device hinge of claim 7, wherein the first hinge component and the second hinge component are movable relative to one another about a central axis of the barrel such that the first friction surface and the second friction surface are to rotate against one another in a concentric manner if the first hinge component and the second hinge component are moved relative to one another.

9. The device hinge of claim 8, wherein the first friction surface and the second friction surface form a friction interface.

10. The device hinge of claim 9, further comprising multiple friction interfaces, wherein one of the multiple friction interfaces is the friction interface between the first friction surface and the second friction surface, each of the multiple friction interfaces including two friction surfaces abutted against each other and movable relative to one another, wherein at least one friction surface of each of the multiple friction interfaces comprises a graphene coating.

11. The device hinge of claim 7, further comprising a plurality of bias members disposed along the barrel to urge the first friction surface and the second friction surface against one another.

12. The device hinge of claim 11, wherein the plurality of bias members are a plurality of dome springs.

13. A computing device, comprising:
a base portion;
a display portion;
a device hinge comprising:
a base structure fixed to the base portion, the base structure comprising:
a first hinge component having a first friction surface with multiple graphene coatings; and
a secondary structure fixed to the display portion, the secondary structure comprising:
a second hinge component having a second friction surface with multiple graphene coatings abutted against the first friction surface and movable relative to the first friction surface, wherein the first hinge component comprises a barrel extending through a central bore of the second hinge component, wherein the second hinge component is rotatable about the barrel, and wherein the barrel and a bore of the first hinge have complementary geometry to prevent rotation of the first hinge component about the barrel;
wherein the base portion and the display portion are rotatable relative to one another through the device hinge, the first friction surface to move relative to the second friction surface if the base portion is rotated relative to the display portion.

14. The computing device of claim 13, wherein the base portion is rotatable relative to the display portion along an axis of rotation of the device hinge.

15. The computing device of claim 13, wherein the first friction surface and the second friction surface are to rotate against one another in a concentric manner about the axis of rotation of the device hinge if the base portion and the display portion are rotated relative to one another.

* * * * *